(12) United States Patent
Wareing

(10) Patent No.: US 9,807,164 B2
(45) Date of Patent: Oct. 31, 2017

(54) HALO BASED FILE SYSTEM REPLICATION

(71) Applicant: Facebook, Inc., Menlo Park, CA (US)

(72) Inventor: Richard Theodore William Wareing, Santa Cruz, CA (US)

(73) Assignee: Facebook, Inc., Menlo Park, CA (US)

( * ) Notice: Subject to any disclaimer, the term of this patent is extended or adjusted under 35 U.S.C. 154(b) by 445 days.

(21) Appl. No.: 14/341,547

(22) Filed: Jul. 25, 2014

(65) Prior Publication Data

US 2016/0028806 A1  Jan. 28, 2016

(51) Int. Cl.
| | | |
|---|---|---|
| *G06F 11/00* | (2006.01) | |
| *G06N 5/02* | (2006.01) | |
| *G06F 17/30* | (2006.01) | |
| *H04L 29/08* | (2006.01) | |

(52) U.S. Cl.
CPC ...... *H04L 67/1095* (2013.01); *H04L 67/1021* (2013.01)

(58) Field of Classification Search
CPC .................. H04L 67/1095; H04L 67/1021
USPC .......................................................... 709/217
See application file for complete search history.

(56) References Cited

U.S. PATENT DOCUMENTS

| | | | | |
|---|---|---|---|---|
| 7,769,722 B1* | 8/2010 | Bergant | ............. | G06F 11/2097 707/681 |
| 8,341,115 B1* | 12/2012 | Natanzon | ............ | G06F 11/1471 707/613 |
| 8,407,182 B1* | 3/2013 | Rajaa | ................ | G06F 17/30079 707/610 |
| 8,667,330 B1* | 3/2014 | Chatterjee | ......... | G06F 17/30008 707/674 |
| 8,706,971 B1* | 4/2014 | Nayak | ................ | G06F 12/0891 711/133 |
| 8,732,403 B1* | 5/2014 | Nayak | ................... | G06F 3/0641 711/135 |
| 8,838,539 B1* | 9/2014 | Ashcraft | ................ | H04L 67/02 707/637 |
| 9,246,996 B1* | 1/2016 | Brooker | ............. | H04L 67/1008 |
| 2007/0136389 A1* | 6/2007 | Bergant | .............. | G06F 11/1435 |
| 2007/0266027 A1* | 11/2007 | Gattegno | .............. | G06F 3/0605 |
| 2009/0106480 A1* | 4/2009 | Chung | ................ | G06F 12/0866 711/100 |
| 2010/0153703 A1* | 6/2010 | Dodgson | .............. | G06F 21/805 713/153 |

(Continued)

*Primary Examiner* — Kevin Bates
*Assistant Examiner* — Golam Mahmud
(74) *Attorney, Agent, or Firm* — Perkins Coie LLP

(57) ABSTRACT

The disclosure is directed to replicating datasets between data storage servers in a distributed computer network synchronously and asynchronously ("the technology"). A replication interface receives a request from a client to store a dataset in the distributed computer network. The replication interface identifies a first set of storage servers that are within a halo defined by the client. The replication interface replicates the dataset to the first set of the storage servers synchronously, and a remaining set of the storage servers, e.g., storage servers that are outside of the halo asynchronously. The replication interface can perform the synchronous and asynchronous replication simultaneously. The halo can be determined based on various parameters, including a halo latency, which indicates a permissible latency threshold between the client and a storage server to which the dataset is to be replicated synchronously.

19 Claims, 10 Drawing Sheets

(56) References Cited

U.S. PATENT DOCUMENTS

| | | | |
|---|---|---|---|
| 2010/0161981 A1* | 6/2010 | Dodgson | G06F 21/80 713/168 |
| 2010/0228819 A1* | 9/2010 | Wei | G06F 9/505 709/203 |
| 2011/0022879 A1* | 1/2011 | Chavda | G06F 11/0793 714/1 |
| 2014/0074798 A1* | 3/2014 | Karampuri | G06F 17/3007 707/689 |
| 2014/0143220 A1* | 5/2014 | Foster | G06F 17/30091 707/705 |
| 2014/0324785 A1* | 10/2014 | Gupta | G06F 17/30368 707/689 |

* cited by examiner

HALO BASED FILE SYSTEM REPLICATION

BACKGROUND

Current data replication techniques replicate data from a read-write master/primary data storage server to read-only slave/secondary data storage servers. (Data storage servers can be referred to herein as simply storage servers.) The primary storage server and the secondary storage servers can be located in different geographical regions. One of the drawbacks of such a replication technique can include a slow write operation if a client that is writing data to the primary storage server is located in a geographical region different from that of the primary storage server. Moreover, if the write operation is a synchronous write operation, the client can experience an additional delay, which is incurred in writing the data to the secondary storage servers. Typically, the client is unaware of why the write operations are slow, which can lead the clients to believe that the application writing the data is faulty or slow.

Another drawback of such a replication technique can include an overhead in maintenance of the replication infrastructure. For example, reconfiguring one of the secondary storage severs as a primary storage server and the current primary storage as a secondary storage server would typically require manual intervention by a user such as an administrator of the replication infrastructure. Further, such a reconfiguration can be burdensome as the user has to perform a number of steps to ensure data consistency, e.g., data from the current primary storage server has to be copied to the new primary storage server before the new primary storage server can be deployed again.

The risk of data loss is also significant with such replication techniques. Since there is only one primary storage server, if the primary storage server fails, the data writes may fail, which can be fatal to the application. In another scenario, if the primary storage server fails before the data is replicated to the read-only secondary storage servers, the data is lost. Further, the chances of data corruption is significant in such replication techniques, especially if a write operation fails at the secondary storage servers after the storage servers have agreed to a "consistency point," which is a time when all data storage servers are guaranteed to have the same data.

BRIEF DESCRIPTION OF THE DRAWINGS

FIG. 7 is an example of resolving replication conflicts that can occur in halo based replication when datasets from different clients are similar.

DETAILED DESCRIPTION

Figure 1:
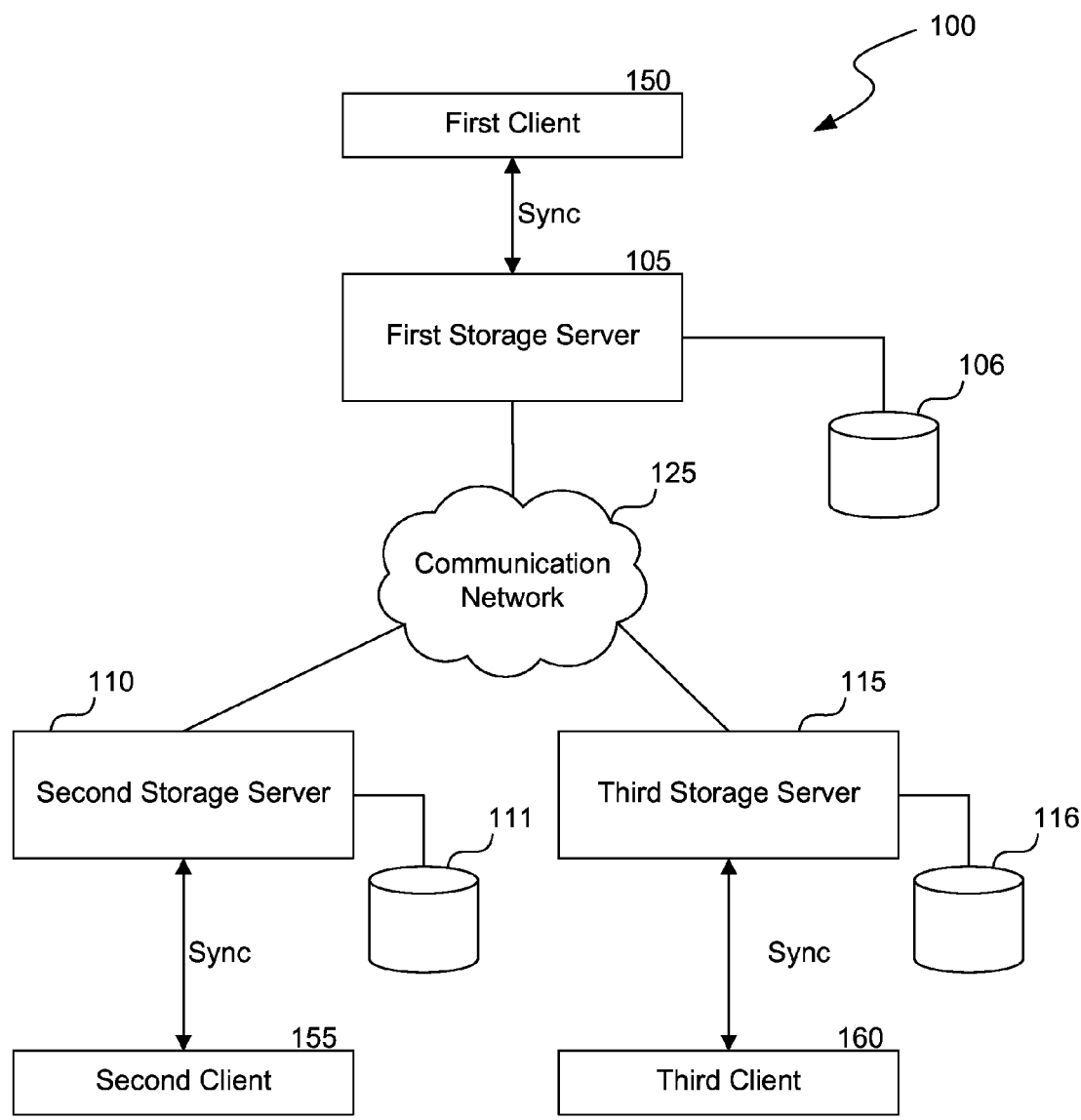
FIG. 1 is a block diagram illustrating a distributed computing environment ("environment") in which the halo based replication can be implemented.

The disclosed embodiments are directed to replicating datasets between data storage servers in a distributed computer network synchronously and asynchronously. Embodiments facilitate a client to replicate a dataset synchronously to a first set of storage servers and asynchronously to other storage servers, e.g., remaining one or more of the storage servers. Embodiments replicate data synchronously to a set of storage servers located within a "halo," and asynchronously to a set of storage servers located outside of the halo. The halo defines a group of storage servers, and can be defined based on various parameters, e.g., a latency between the storage nodes and/or redundancy requirements imposed by the client, e.g., by an application executing on the client that intends to replicate the dataset. For example, storage servers that have latency below a specified latency threshold can be defined to be in the halo. In some embodiments, embodiments simultaneously or concurrently replicate the data synchronously to the storage servers within the halo and asynchronously to storage servers outside of the halo.

In some embodiments, a synchronous replication to a set of storage servers is an atomic write operation, e.g., a write operation either completes on all storage servers in the set or not at all. A write is not considered complete until acknowledgement by all the storage servers in the set. In some embodiments, an asynchronous replication to the set of storage servers is considered to be complete as soon as one of the storage servers in the set acknowledges the write operation. The remaining storage servers in the set are updated, but probably with a lag. One of the differences between synchronous and asynchronous replication is that synchronous replication needs to wait for all the storage servers in the set to acknowledge the write operation.

The halo can be defined in various ways. For example, different halos can be defined for different clients, for different applications on a client, or for different datasets, e.g., directories, on a client.

The storage servers can be spread across datacenters, e.g., in different geographical regions. The embodiments can also include a policy-based mechanism for resolving replication conflicts (e.g., datasets with same name, different updates to the same file by different clients at approximately the same time, etc.). Policies can be defined to resolve conflicts based on a number of copies of the datasets available from each source, a time at which the dataset from each of the sources is created, a majority vote from the replicated data storage servers, etc.

Embodiments can include a policy-based mechanism for resolving replication conflicts (e.g., datasets with same name, different updates to the same file by different clients at approximately the same time, etc.). Policies can be defined to resolve conflicts based on a number of copies of the datasets available from each source, a time at which the dataset from each of the sources is created, a majority vote from the replicated data storage servers, etc.

Environment

FIG. 1 is a block diagram illustrating a distributed computing environment ("environment") 100 in which the halo based replication can be implemented. The environment 100 includes a number of storage servers, e.g., first storage server 105, a second storage server 110 and a third storage server 115, that can store datasets received from one or more clients such as a first client 150, a second client 155 and a third client 160. The storage servers store the datasets at their associated storage units such as a first storage unit 106, a second storage unit 111, and a third storage unit 116. The clients can be file based clients, e.g., a network file system (NFS) client, that manage datasets as files, or block based clients, e.g., a SnapMirror of NetApp of Sunnyvale, Calif., that manage datasets as blocks of data. In some embodiments, in block based storage, raw volumes of storage are created and each block can be controlled as an individual hard drive. These blocks are controlled by server based operating systems and each block can be individually formatted with the required file system. The distributed computing environment 100 supports various types of clients, including file based clients and block based clients.

In some embodiments, the distributed computing environment 100 can be a portable operating system interface (POSIX) compliant environment. That is, the storage servers support storage of POSIX compliant datasets. In some embodiments, POSIX is a family of standards for maintaining compatibility between operating systems (OS), e.g., between OS of clients and storage servers. POSIX defines the application programming interface (API), along with command line shells and utility interfaces, for software compatibility with variants of Unix and other operating systems.

The storage servers can be spread across datacenters, e.g., in different geographical regions. In some embodiments, a geographical region has multiple storage servers. For example, the first storage server 105 can be in a first geographical region, the second storage server 110 can be in a second geographical region and the third storage server 115 can be in a third geographical region. In another example, the first storage server 105 can be in a first geographical region and the storage servers 110 and 115 can be in a second geographical region. A storage server communicates with other storage servers via a communication network 125. The communication network 125 can be a variety of networks such as Internet, Local Area Network (LAN), Wide Area Network (WAN) and other wireless networks. The clients can communicate with the storage servers via a communication network similar to the communication network 125.

A replication interface (not illustrated) facilitates the replication of datasets from the clients to the storage servers and also from one storage server to the other storage servers. The replication interface can be implemented in various configurations. For example, a portion of the replication interface is implemented in a client and another portion of the replication interface is implemented in a storage server. In another example, the replication interface is implemented in an independent computing system different from the client and the storage server that can facilitate the replication of data from the client to the storage servers and between the storage servers. In the distributed computing environment 100, a portion of the replication interface is implemented in a client such as a first client 150 and another portion of the replication interface is implemented in a storage server such as first storage server 105.

The client can customize the replication interface to suit the replication preferences of the client. In some embodiments, the client can specify the replication preferences in a storage policy, which is used by the replication interface to replicate the datasets from the client to the storage servers in the environment 100. The client can specify various parameters such as a halo latency, a minimum number of replicas to stored, a maximum number of replicas, storage servers where the replicas is to be stored, a priority for replicating a dataset to a particular storage server, a sequence in which the dataset is to be replicated to the storage servers, etc. in the storage policy.

When a client requests to replicate a dataset to the storage servers in the environment 100, the replication interface identifies a set of storage servers that satisfies the storage policy defined by the client. The set of storage servers identified based on the storage policy are considered to be within a halo defined by the client and the other storage servers are considered to be outside the halo. The replication interface replicates the dataset to the set of storage servers within the halo synchronously and asynchronously to the storage servers that are outside of the halo. In some embodiments, the synchronous and asynchronous replication may occur simultaneously or concurrently.

Figure 2:
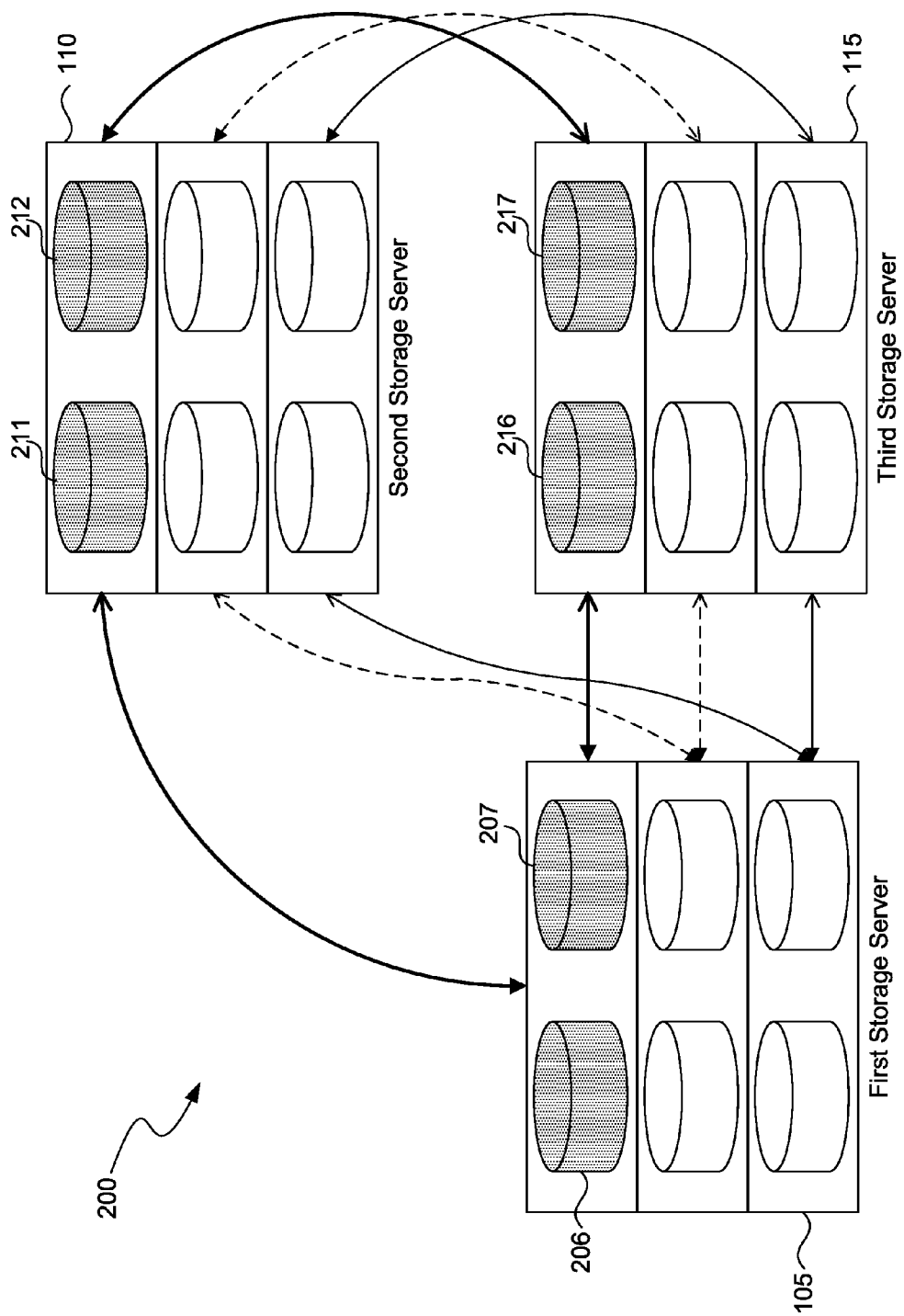
FIG. 2 is a block diagram illustrating the environment of FIG. 1 implemented using GlusterFS distributed file system.

FIG. 2 is a block diagram 200 illustrating the distributed computing environment 100 implemented using GlusterFS distributed file system. A GlusterFS is a scale-out network attached storage (NAS) file system. The GlusterFS is a POSIX compliant file system. GlusterFS aggregates various storage servers over various interconnects, e.g., Ethernet or Infiniband RDMA, into one parallel network file system. GlusterFS has client and server programs. Storage servers in GlusterFS are typically deployed as storage bricks, with each storage server running a server daemon program to export a local file system on the storage server as a volume to the client. The client program, which connects to storage servers with a protocol over TCP/IP, InfiniBand or Sockets Direct Protocol, can create composite virtual volumes from multiple storage servers using stackable translators. The final volume may then be mounted by the client, e.g., using a native protocol via the file system in user space (FUSE) mechanism, using NFS v3 protocol. GlusterFS may be used in applications such as cloud computing, streaming media services, and content delivery networks.

The storage servers 105-115 store datasets in storage bricks as illustrated in FIG. 2. For example, the first storage server 105 stores a dataset received from the first client 150 in a first brick 206. In some embodiments, a storage brick can have a replica. Further, the replica brick can be in the same storage server and/or a remote storage server. For example, in the diagram 200, a dataset is replicated to six storage bricks—to the first brick 206 and its five replicas, e.g., a second brick 207, a third brick 211, a fourth brick 212, a fifth brick 216, and a sixth brick 217. Note that the replica bricks are distributed among various storage servers. In some embodiments, a set of the replica bricks are considered as a volume. For example, the six storage bricks—the first brick 206, the second brick 207, the third brick 211, the fourth brick 212, the fifth brick 216, and the sixth brick 217 form a volume. The client such as the first client 150 can mount the volume, e.g., on a file system of the first client 150, to access the datasets stored in the bricks of the volume. In some embodiments, by mounting the volume on the first client 150, the first client 150 may access the datasets in the volume as if the volume is a local storage unit, e.g., a disk drive, of the first client 150 though the datasets are stored remotely.

Although the storage servers depicted in FIG. 2 illustrate two replicas per storage server, the number of replicas in a storage server is configurable. Further, different storage servers may have different number of replicas. The storage bricks may implemented in the storage units, e.g., a first storage unit 106, a second storage unit 111, and a third storage unit 116, associated with the storage servers.

In some embodiments, the storage bricks in a storage server are connected to their corresponding replica bricks on the other storage servers in the environment 100, as illustrated n FIG. 2. Further, the client can be connected to each of the bricks in the volume. However, connections to some of the bricks can be dormant, that is, in standby or inactive. For example, connections to storage bricks of the storage servers that are not in the halo (referred to as "stand-by" storage bricks) defined by the client may be dormant. In some embodiments, the connection to the stand-by storage bricks are configured to be dormant rather than having the stand-by bricks disconnected so that the client can be failed over to the stand-by bricks more efficiently, e.g., without incurring time for setting up the connection such as transport control protocol (TCP) setup time. In some embodiments, having the connections to the stand-by bricks dormant can reduce failover times significantly depending on the transport protocol used.

When the client replicates data to the storage servers, the dataset is replicated to one or more bricks of the one or more storage servers based on the storage policy. Further, in some embodiments, the dataset is replicated synchronously to some of the storage servers and asynchronously to some of the storage servers, as described in the following paragraphs.

In some embodiments, the halo based replication can be implemented in storage mechanisms where datasets are stored as shards at different storage servers. A shard can be a portion of a dataset. For example, if a dataset has one thousand rows of data, the dataset can be split into two (or more) shards, each having five hundred rows of data. The two shards can be stored at different storage servers. Referring back to FIG. 2, in some embodiments, each of the rows in the storage servers 105-115 can be considered as a shard and each shard can have multiple storage bricks. Further, the replica storage bricks for each of the shards can span across storage servers of different regions. For example, each of the rows in the first storage server 105 forms a shard and each shard has replica storage bricks, e.g., storage bricks 206 and 207 in the first storage server 105 and replica storage bricks 211, 212, 216 and 217 in storage servers 110 and 115 making it a total of six replica storage bricks per shard. The entirety of all eighteen storage bricks across storage servers 105-115 is a cluster hosting a single volume of the storage system.

Figure 3:
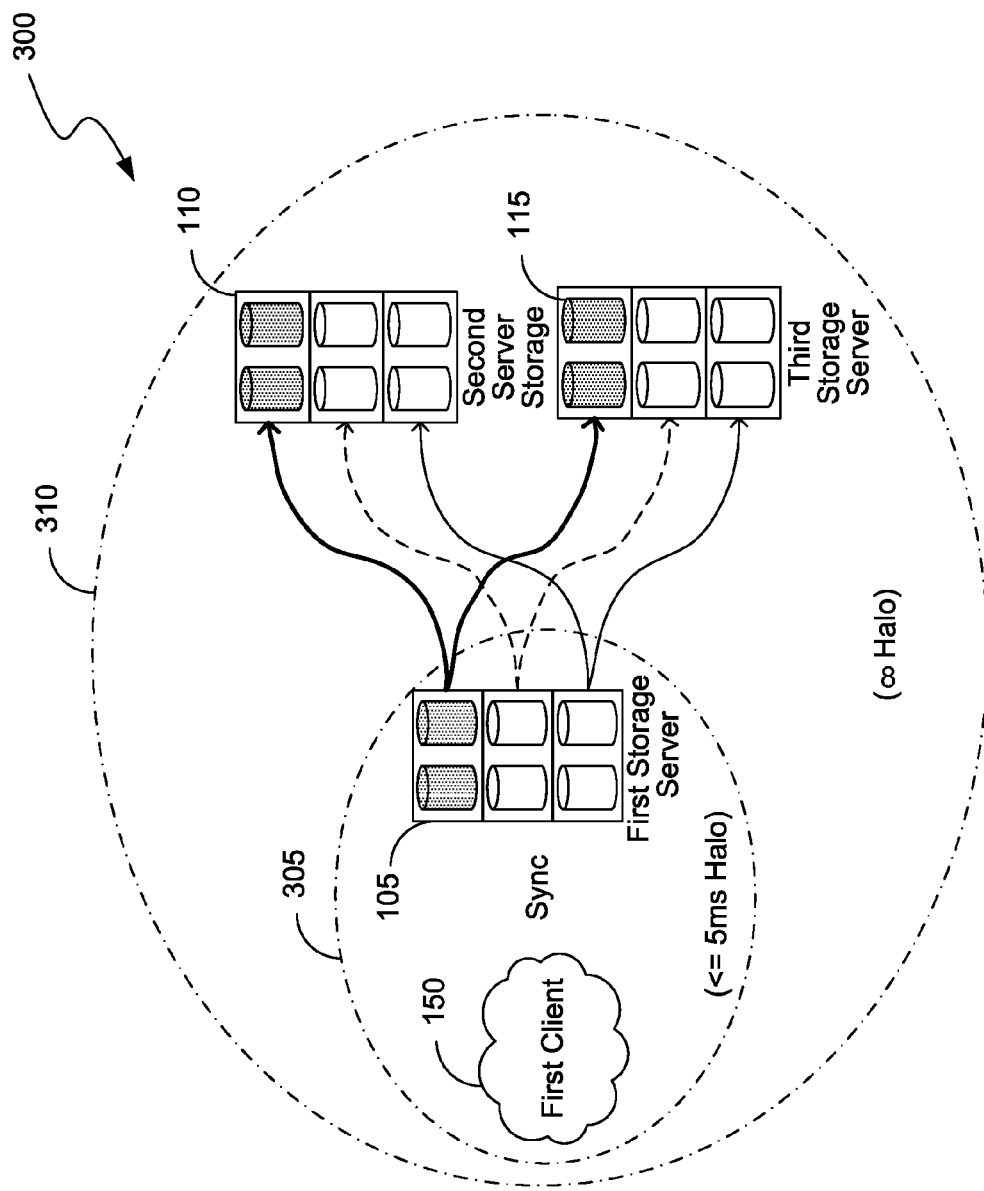
FIG. 3 is a block diagram illustrating halo based replication in the environment of FIG. 1.

FIG. 3 is a block diagram 300 illustrating halo based replication in the environment 100. In the halo based replication, a dataset from a client is replicated to a set of servers that are located within a halo defined by the client synchronously and asynchronously to the remaining set of the servers. For example, for a first client 150, the first storage server 105 is within the halo 305 defined by the first client 150 and the storage servers, second storage server 110 and the third storage server 115 are located outside the halo 305. Accordingly, the dataset from the first client 150 is replicated to the first storage server 105 synchronously and asynchronously to the second storage server 110 and the third storage server 115. In some embodiments, the asynchronous replication is performed by the first storage server 105, e.g., the first storage server 105 replicates the dataset received from the first client 150 to the second storage server 110 and the third storage server 115.

The halo 305 can be determined based on various halo parameters, which can be specified in the storage policy. For example, the halo 305 can be defined based on a halo latency, which defines a permissible latency between a client and a storage server to which the dataset is to be replicated synchronously. In some embodiments, latency between a client and a storage server is defined as time elapsed between a dispatch of a request from the client to the storage server and a receipt of the response from the storage server by the client. Referring back to the example in diagram 300, the first client 150 has defined a halo latency of five milliseconds (5 ms). The replication interface determines that only the first storage server 105 has a latency less than or equal to 5 ms and therefore, the replication interface considers that the first storage server 105 is within the halo 305 defined by the first client 150. Therefore, the replication interface replicates the dataset from the first client 150 synchronously and asynchronously to the other storage servers. Further, the replication interface performs the synchronous and asynchronous replication simultaneously or concurrently.

Similarly, the replication interface can replicate a dataset from the second client 155 to the second storage server 110 synchronously (assuming the second storage server 110 is within the halo of the second client 155) and asynchronously to the first storage server 105 and the third storage server 115. Similarly, the replication interface can replicate a dataset from the third client 160 to the third storage server 115 synchronously (assuming the third storage server 115 is within the halo of the third client 160) and asynchronously to the first storage server 105 and the second storage server 110. As the dataset of a client is available in all of the storage servers and the client can write to any of the storage servers, there is no notion of master-slave storage systems in the environment 100. In other words, all the storage servers can act as masters.

In some embodiments, each of the storage servers 105-115 can track changes to the dataset independent of one another and replicate the changes to the other storage servers. The storage servers can track the changes to the dataset in a number of ways, e.g., using logs, journals. Any conflicts that may arise during replication of a dataset between any two storage servers can be resolved using conflict resolution policies, e.g., defined by a client or storage server. In other words, the environment 100 can tolerate and/or resolve conflicts even without a master storage server.

In some embodiments, the halo 305 can be defined based on tags associated with a storage server. A tag describes a particular attribute associated with the storage server. For example, a tag can indicate a geographical region in which the storage server is located, a replica capacity of the storage server, a total storage capacity of the storage server, or a workload of the storage server. A client can specify in the storage policy that the dataset has to be replicated to storage servers having a particular tag. For example, the client can specify a halo parameter such as "tag=East Coast" in the storage policy, which will cause the replication interface to identify all storage servers in the east coast of the U.S. as being within the halo defined by the client and replicate the dataset to the identified storage servers synchronously.

In some embodiments, by replicating the dataset synchronously to some of the storage servers and asynchronously to the other storage servers, the replication interface provides an optimum balance between the data loss risk associated with asynchronous replication and the consumption of computing resources, e.g., network bandwidth and time, associated with synchronous replication. For example, by replicating the dataset synchronously to a subset of the storage servers, the replication interface provides zero to minimum data loss risk and reduces the computing resources required for replicating the datasets synchronously by replicating to a subset of the storage servers instead of all the storage servers. Additionally, the replication interface ensures that the datasets are available at all the storage servers in the environment 100 by replicating the dataset to the remaining storage servers asynchronously with minimum consumption of computing resources for the replication.

If the halo replication is implemented in the GlusterFS distributed file system, in some embodiments, the asynchronous replication may be performed by a daemon program such as a self-healing daemon (SHD) program executing on a storage server. The SHD daemon program typically has an infinite halo 310, that is, it can replicate the dataset to the storage servers regardless of the latency of the storage servers, e.g., to storage servers that have a latency exceeding the permissible latency defined by the client. As illustrated in diagram 300, the SHD replicates the datasets from the first storage server 105 to the second storage server 110 and the third storage server 115. Note that the datasets in the storage bricks of the first storage server 105 are replicated to the corresponding replica bricks in the second storage server 110 and the third storage server 115. The synchronous replication can be performed by a translator program, e.g., automatic file replication translator (AFR), which can execute (at least a portion of it) on the client. In some embodiments, the AFR executes on the storage servers. In some embodiments, the SHD uses the AFR to replicate the dataset. Unlike the SHD, the AFR translator has a limited halo, which corresponds to the halo latency defined by the client.

Figure 4:
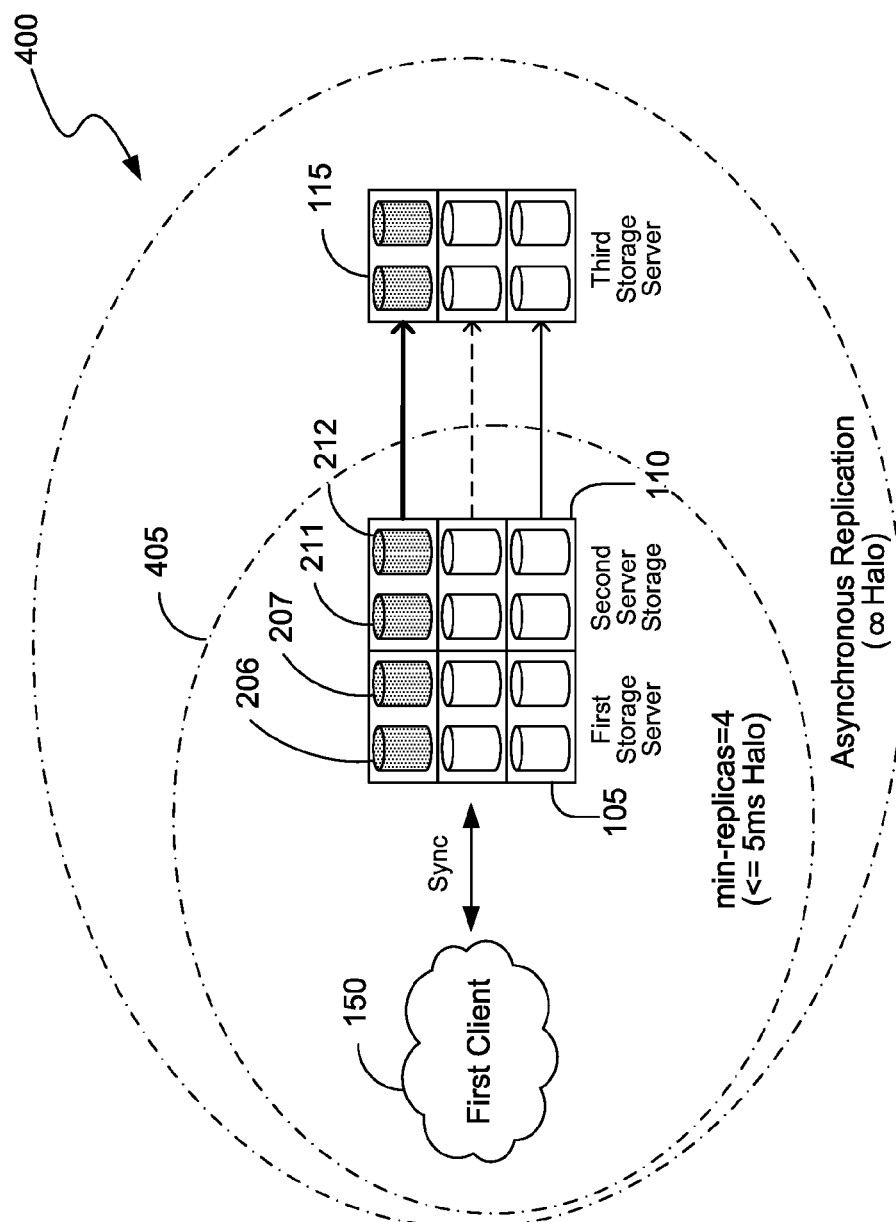
FIG. 4 is a block diagram illustrating replication of datasets in a halo determined based on a number of replicas.

FIG. 4 is a block diagram 400 illustrating replication of datasets in a halo determined based on a number of replicas. In some embodiments, the halo based replication also depends on parameters other than halo parameters. For example, in addition to specifying a halo parameter such as halo latency for determining the halo, the client may also specify (in the storage policy) a number of replicas to be created for the dataset. The replication interface identifies, based on the halo latency, a first set of storage servers that are within the halo, e.g., halo 305 of FIG. 3, and determines whether the first set of storage servers have enough resources, e.g., replica bricks, to store the number of replicas specified in the storage policy.

If the first set of storage servers has enough resources, the replication interface replicates the dataset to the first set of storage servers synchronously. However, if the first set of storage servers does not have enough resources to store the specified number of replicas, the replication interface identifies additional storage servers that can store the remaining number of replicas and considers the additional storage servers to be part of the halo 305, e.g., as indicated by halo 405. The replication interface proceeds with replicating the dataset to the first set of storage server and the additional storage servers synchronously.

As illustrated in the block diagram 400, the first client 150 has specified parameters such as a halo latency of 5 ms and a minimum number of replicas of 4, e.g., in the storage policy. The replication interface identifies that of all the storage servers, the first storage server 105 is within the halo of 5 ms. However, the maximum number of replicas that can be created in the first storage server 105 is two (2), e.g., one each in storage bricks 206 and 207. Accordingly, the replication interface identifies one or more additional storage servers, e.g., the second storage server 110, to store the remaining two replicas, e.g., in storage bricks 211 and 212, and adds the second storage server 110 to the halo 405, as illustrated block diagram 400. The replication interface replicates the dataset from the first client 150 to the first storage server 105 and the second storage server 110 synchronously. The replication interface replicates the dataset to the third storage server 115 asynchronously.

The replication interface may choose one or more of the remaining storage servers in the environment 100 as an additional storage server(s) based on various criteria, e.g., workload of the storage servers, latency of the storage servers. In some embodiments, the replication interface may choose the additional storage server(s) based on a latency of the storage server with the client, e.g., chooses one that has the lowest latency among the remaining of the storage servers.

Figure 5:
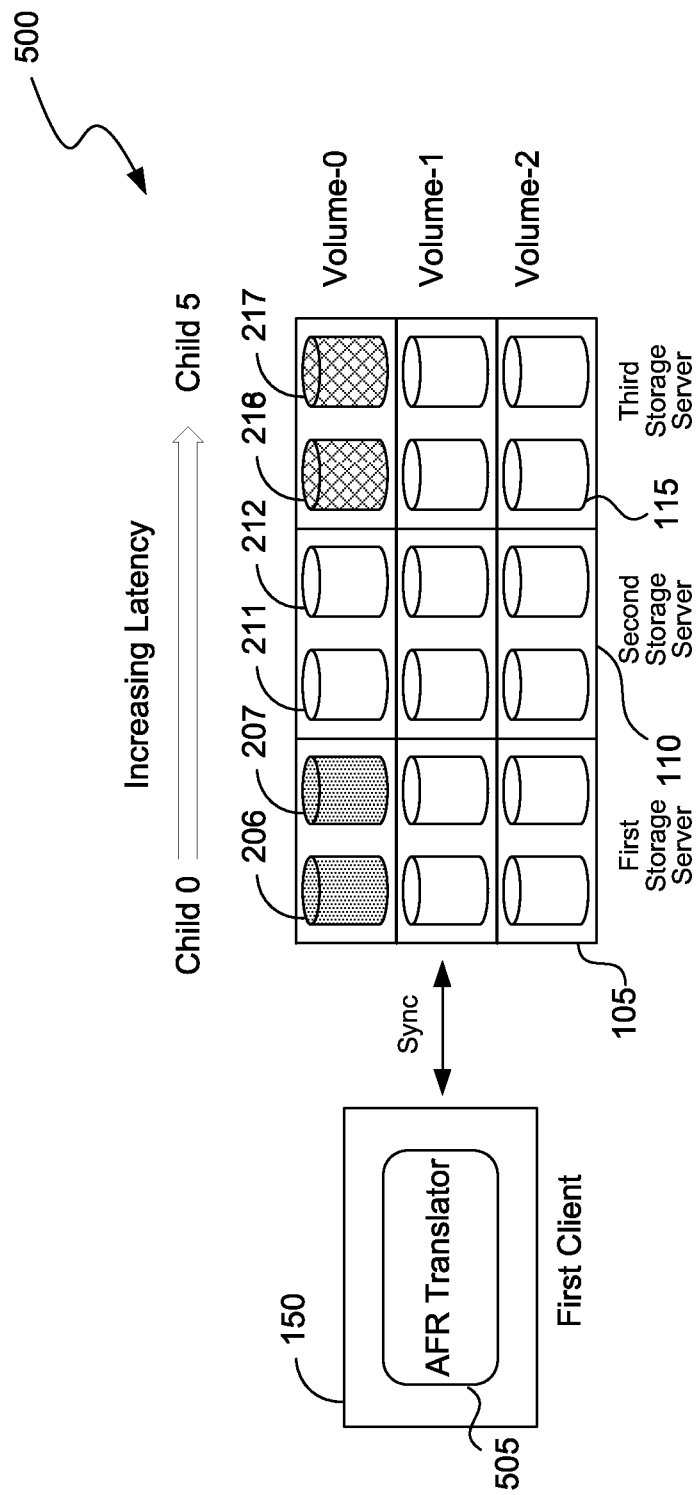
FIG. 5 is a block diagram illustrating an implementation of halo based replication using the automatic file replication (AFR) translator of the GlusterFS distributed file system.

FIG. 5 is a block diagram 500 illustrating an implementation of halo based replication using the AFR translator of GlusterFS distributed file system. As described at least with reference to FIG. 2, a set of replica bricks form a volume and a client can access the datasets in the volume by mounting the volume on a local file system of the client. As illustrated in block diagram 500, the environment 100 includes three volumes. A first volume includes replica storage bricks 206-217.

For the halo based replication, the replication interface identifies a set of storage servers to be within the halo based on the storage policy. The remaining set of the storage servers are determined to be outside of the halo. Continuing with the halo latency of 5 ms described at least with reference to block diagram 300 of FIG. 3, the replication interface determines that the first storage server 105 is within the halo of the client and the second storage server 110 and the third storage server 115 are outside of the halo.

The AFR translator 505, which, in some embodiments, executes on the first client 150, identifies or marks the storage bricks of the storage servers that are within the halo as "online" and the storage bricks of the storage servers that are outside of the halo as "stand-by." In the block diagram 500, the AFR translator 505 marks the storage bricks of the first storage server 105, e.g., storage bricks 206 and 207 as online and the storage bricks of the second storage server 110 and the third storage server 115, e.g., the storage bricks 211-217 as stand-by. When a client mounts the volume, the client will have network connections, e.g., communication links, to each of the bricks in the volume. The AFR translator suspends or deactivates the communication links to the stand-by storage bricks while retaining the communication links to the online storage bricks in active state. When the replication interface, e.g., the AFR translator 505 in the replication interface, replicates the dataset to the storage servers, the dataset is replicated synchronously to the online storage bricks and asynchronously to the stand-by storage bricks.

The set of replica bricks in the volume are referred to as child bricks of the volume. In some embodiments, the child bricks are arranged in the volume in an ascending order of a latency of the storage server to which a child brick corresponds.

Figure 6:
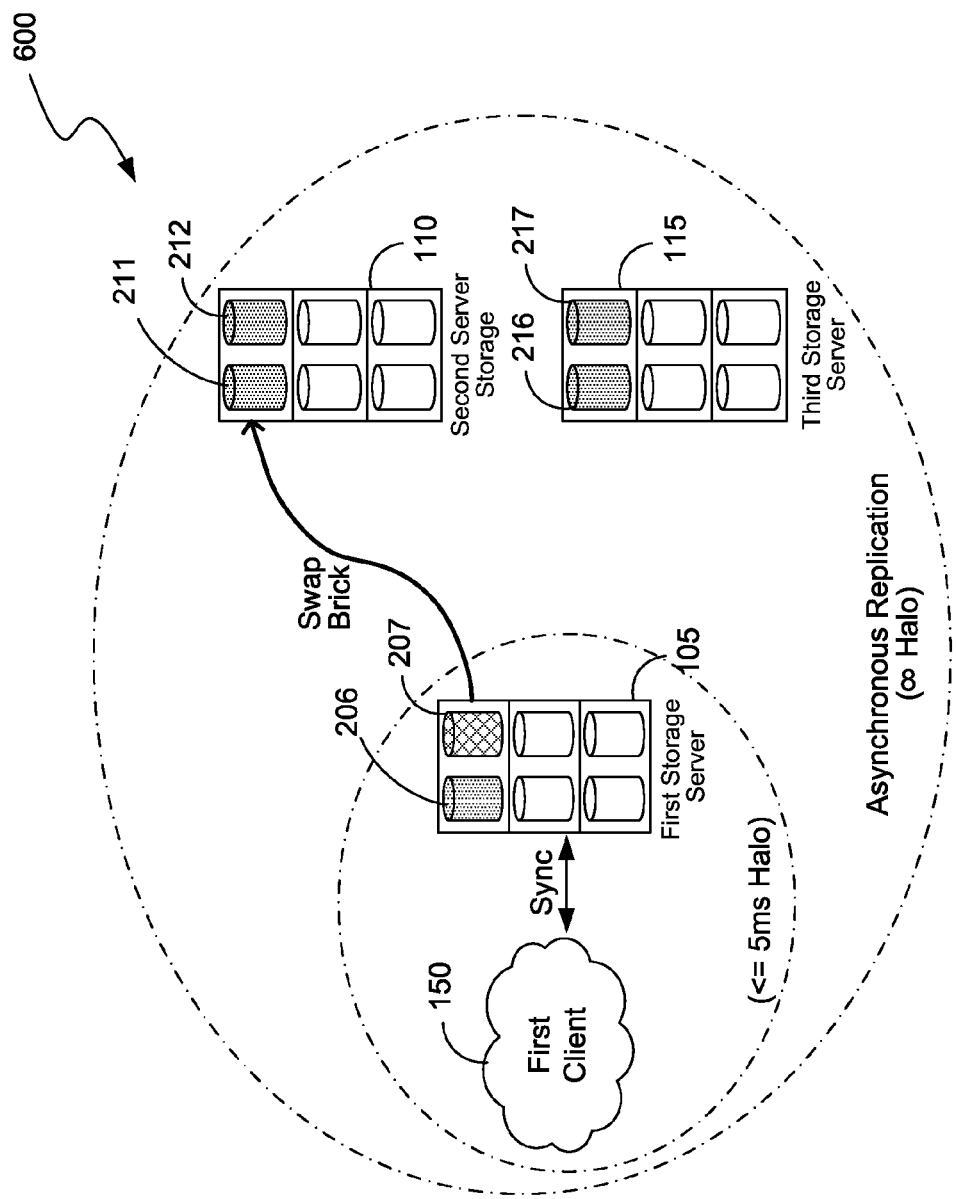
FIG. 6 is a block diagram illustrating a mechanism for overcoming a brick failure in a storage server of a GlusterFS distributed file system.

FIG. 6 is a block diagram 600 illustrating a mechanism for overcoming a brick failure in a storage server of a GlusterFS distributed file system. Continuing with the example described at least with reference to FIG. 3, the first storage server 105 is within the halo of the first client 150, and the second storage server 110 and the third storage server 115 are outside of the halo. The dataset from the first client 150 is replicated to the storage bricks 206-217. If a storage brick of the first storage server 105 fails, the replication interface swaps the failed storage brick with a substitute storage brick from another storage server outside the halo. For example, if the second storage brick 207 fails, the replication interface swaps the second storage brick 207 with the third storage brick 212 from the second storage server 110.

The replication interface may choose a storage server in the environment 100 to substitute the failed brick based on various criteria, e.g., workload of the storage servers, latency of the storage servers. In some embodiments, the replication interface may choose the storage server based on a latency of the storage server with the client, e.g., chooses one that has the lowest latency among the remaining of the storage servers, and replaces the failed brick with the chosen storage server.

In some embodiments, the swapping of the failed storage brick with another brick happens seamlessly, e.g., automatically without any intervention from the client. Further, in some embodiments, swapping a failed storage brick with another storage brick includes marking a child storage brick, e.g., in the volume mounted by the client, that has failed as "stand-by" and another child brick, e.g., of the storage server identified by the replication interface to substitute the failed brick, as "online." In the diagram 600, the replication interface marks the child brick 207 as "stand-by" and the child brick 212 that substitutes the failed child brick 207 as "online." In some embodiments, swapping the failed child brick with a substitute child brick includes deactivating or suspending the network connection of the client with the failed child brick and activating the network connection with the substitute child brick.

Figure 7:
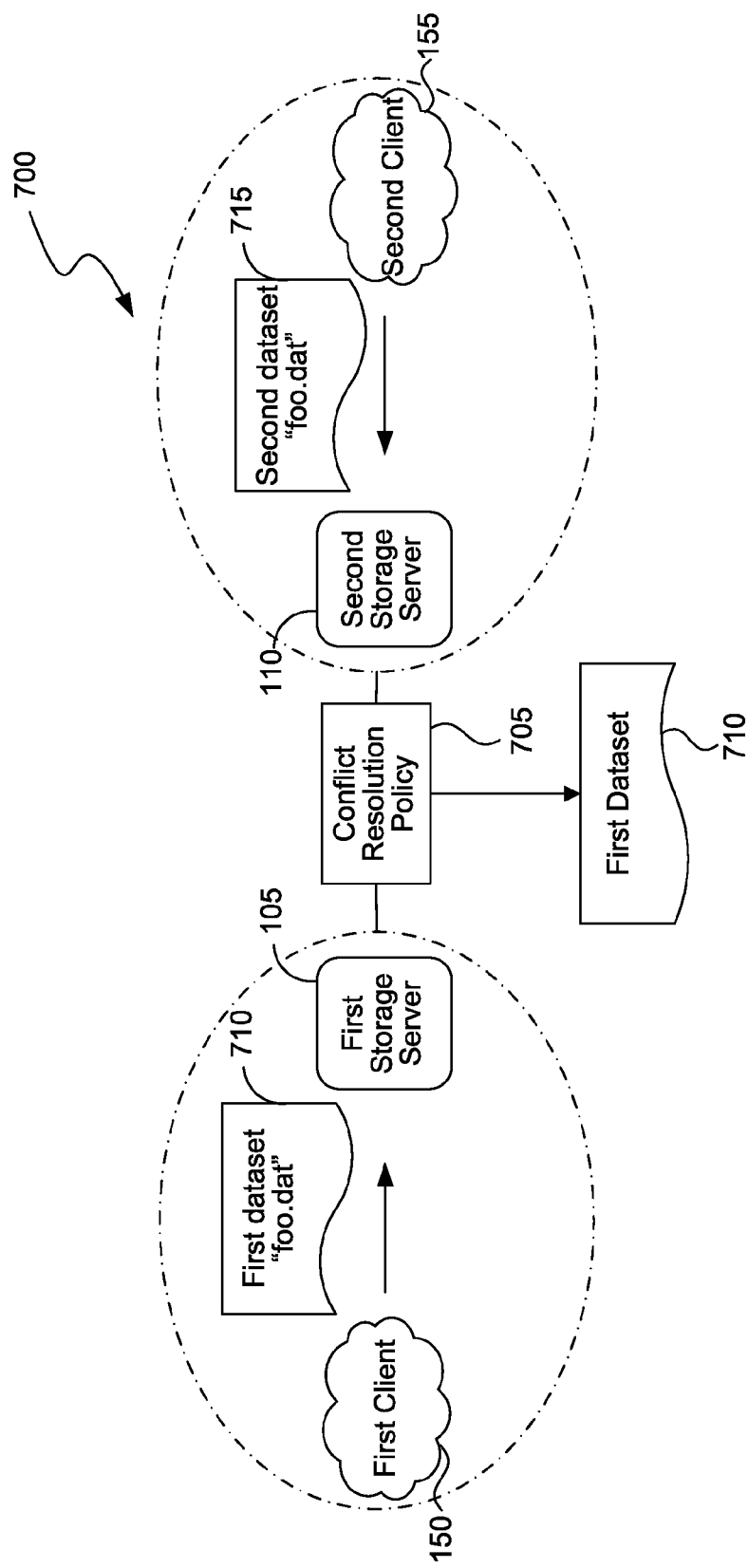

FIG. 7 is an example 700 of resolving replication conflicts that can occur in halo based replication when datasets from different clients are similar. In some embodiments, the example 700 can be implemented in the environment 100 of FIG. 1. As described above in at least with reference to FIGS. 1 and 2, datasets stored at each of the storage servers is replicated to the other storage servers in the environment 100. A replication conflict can occur when a first dataset 710 from the first client 150 and a second dataset 715 from the second client 155 replicated to the storage servers are similar, e.g., files with a common name such as "foo.dat," as illustrated in FIG. 7.

The replication interface can resolve such replication conflicts based on a conflict resolution policy 705. The conflict resolution policy 705 can be defined to resolve conflicts between two similar datasets based on one or more of a source of a particular dataset, a time the particular dataset is created and/or modified, a number of copies of the particular dataset stored in the environment 100, a majority vote from the storage servers, a size of the particular dataset, etc. For example, the conflict resolution policy 705 may be defined to retain a dataset which the environment 100 has the highest number of copies. In another example, the conflict resolution policy 705 may be defined to retain a dataset which has a latest modified time. In some embodiments, atomic clocks may be used to determine the precise modification time of a dataset so that the storage servers can select the right dataset with high precision. In yet another example, the conflict resolution policy 705 may be defined to retain a dataset for which a majority vote is received by the storage servers of the environment 100. In the example 700, the replication interface retains the first dataset 710, e.g., based on the majority vote from the storage servers. In some embodiments, the basis for the "vote" can be determined on any number of metadata attributes of the files, e.g., size, creation time, modification time and/or file fingerprint/signature. If a majority of the storage servers agree on the set of metadata attributes being considered that version of the file/dataset is chosen to resolve the conflict.

The conflict resolution policy 705 can be defined by a user, e.g., user associated with the client and/or an administrator of the environment 100. The replication interface uses the conflict resolution policy 705 to resolve any conflicts that may arise during replication.

Figure 8:
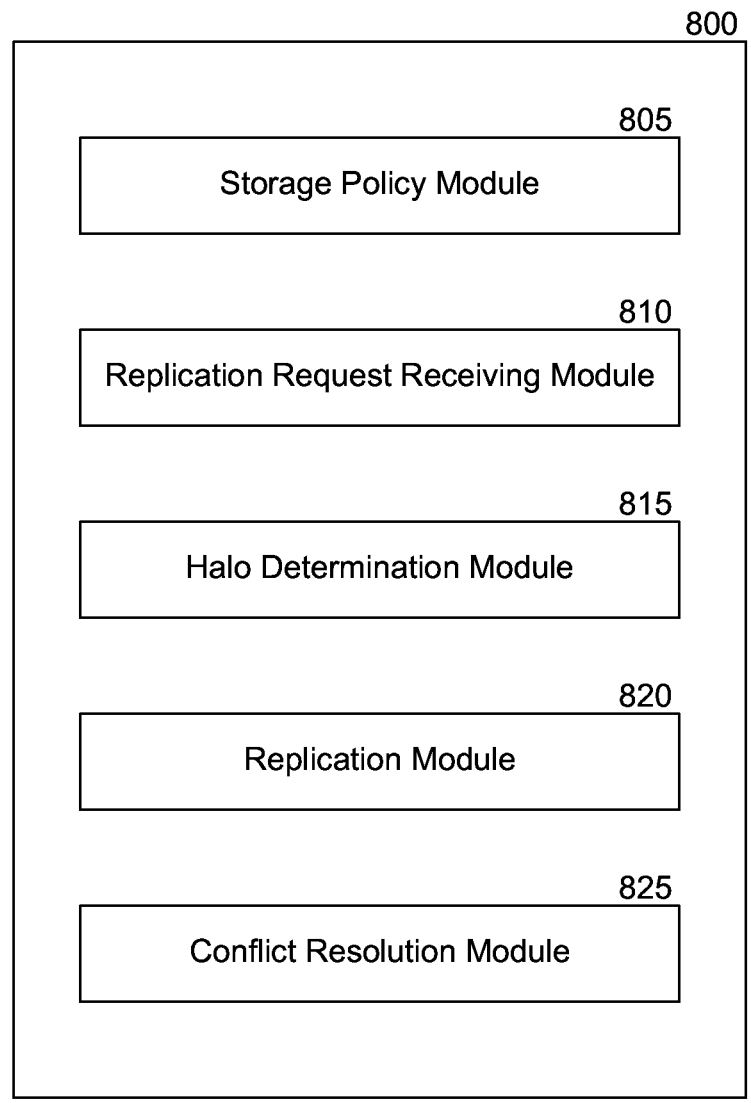
FIG. 8 is a block diagram of a replication interface that can be used in the halo based replication of the environment of FIG. 1.

FIG. 8 is a block diagram of a replication interface 800 that can be used in the halo based replication of the environment 100. The replication interface includes a storage policy module 805 that manages a storage policy used in replicating the datasets from the clients to the storage server. For example, the storage policy module 805 can provide a graphical user interface (GUI) or command line interface (CLI) which can be used the clients to define and/or customize the storage policy. The GUI or CLI facilitates the user to define replication parameters such as a halo parameter, number of replicas to be generated for a dataset, a replication order for the storage servers, etc. The storage policy module 805 also includes the necessary logic to store the storage policy, e.g., in a storage unit associated with a client and/or environment 100 (not illustrated) and make the storage policy accessible to the replication interface 800 as and when needed during the replication.

The replication interface includes a replication request receiving module 810 that receives a request from a client, e.g., a user associated with the client, to replicate a dataset to the storage servers in the environment 100. The replication interface includes a halo determination module 815 that identifies a set of the storage servers that are within a halo defined by the client. The halo determination module 815 determines the halo based on the replication parameters defined in the storage policy. The halo determination module 815 identifies the storage servers that match with halo parameter as the storage servers within the halo defined by the client. For example, the halo determination module 815 identifies the storage servers that have latency below the halo latency defined in the storage policy as the storage servers within the halo of the first client 150. The halo determination module 815 can obtain the latencies of each of the storage servers in the environment 100 in various ways. In some embodiments, the halo determination module 815 may communicate with the storage servers, e.g., send a ping, to determine the latencies of the corresponding storage servers. In another example, the halo determination module 815 identifies the storage servers that have tags that match with the tags defined in the storage policy as the storage servers within the halo of the first client 150. In some embodiments, an administrator of the environment 100 may define the tags for the storage servers.

The halo determination module 815 identifies the storage servers that do not match with the halo parameters as the storage servers outside of the halo. In some embodiments, the halo determination module 815 marks the storage servers that are within the halo as "online" storage servers and the storage servers that are outside of the halo as "stand-by" storage servers.

The replication module 820 replicates a dataset from the client to the storage servers in the environment 100. The replication module 820 replicates the dataset to the online storage servers synchronously and to the stand-by storage servers asynchronously. In some embodiments, the replication module 820 performs the synchronous and asynchronous replication simultaneously or concurrently.

The replication interface 800 includes a conflict resolution module 825 to resolve replication conflicts that can arise during the replication of similar datasets, e.g., files that have a common name, from different clients. In some embodiments, the conflict resolution module 825 resolves the replication conflicts as described above at least with reference to FIG. 7.

The replication interface 800 can be implemented in various configurations. In some embodiments, the replication interface 800 is implemented as an independent computing system in the environment 100, which facilitates the replication of the datasets from the clients to the storage servers. In some embodiments, the replication interface 800 is implemented as a distributed processing system in the environment 100. Different portions of the replication interface 800 can be implemented on different computing systems or a same portion can be implemented in more than one computing system in the environment 100. For example, the storage policy module 805, the replication request receiving module 810 and the halo determination module 815 can be implemented in a client, e.g., first client 150, the replication module 820 can be implemented in both the client and the storage server, and the conflict resolution module 825 can be implemented in the storage servers.

Figure 9:
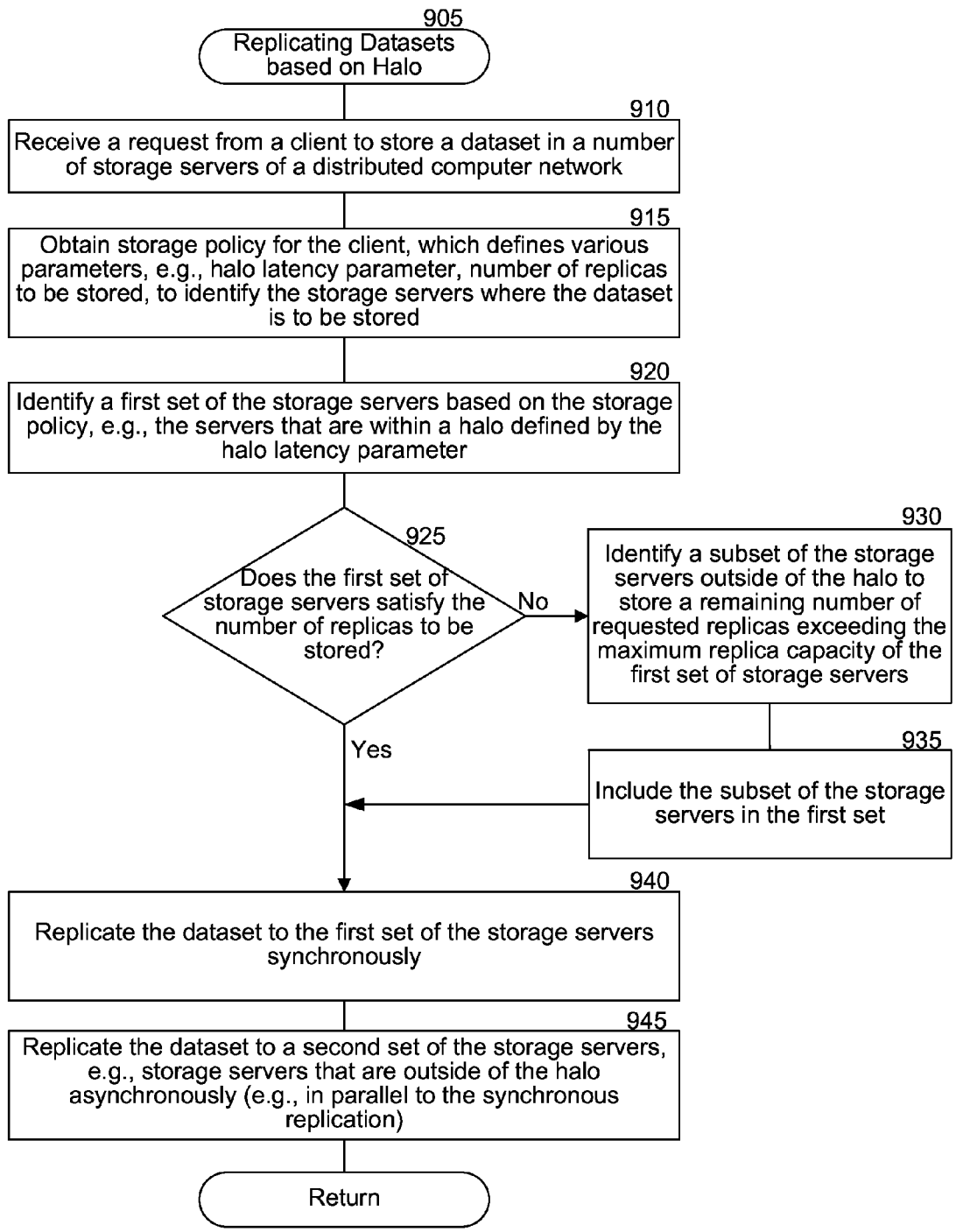
FIG. 9 is a flow diagram of a process for performing a halo based replication in a distributed computing environment of FIG. 1.

FIG. 9 is a flow diagram of a process 900 for performing a halo based replication in a distributed computing environment 100. The process 900 begins at block 905, and at block 910, the replication request receiving module 810 receives a request from a client to store a dataset in a number of storage servers of the environment 100. For example, as illustrated in FIG. 3, the replication request receiving module 810 receives a request from the first client 150 to store a dataset in the storage servers 105, 110 and 115 of the environment 100.

At block 915, the halo determination module 815 requests the storage policy module 805 to obtain the storage policy for the client. The storage policy defines various replication parameters, e.g., a halo parameter, minimum/maximum number of replicas to be stored synchronously, etc. The halo parameter is used to determine halo of the client. For example, as illustrated in FIG. 3, the halo determination module 815 identifies the halo latency as one of the halo parameters.

At block 920, the halo determination module 815 identifies a set of storage servers in the environment that are within a halo of the client. The halo determination module 815 identifies the storage servers based on the halo parameter defined in the storage policy. For example, as illustrated in FIG. 3, the halo determination module 815 identifies the storage servers whose latency does not exceed the 5 ms halo latency specified in the storage policy. The halo determination module 815 identifies the first storage server 105 as being within the halo of 5 ms.

At determination block 925, the halo determination module 815 determines whether the set of storage servers that are within the halo have enough resources to store the number of replicas of the dataset requested by the client. Responsive to a determination that the set of storage servers do not have enough resources to store the requested number of replicas, at block 930, the halo determination module 815 identifies one or more storage servers outside of the halo to store the remaining number of requested replicas, e.g., the number of replicas exceeding the maximum replica capacity of the set of storage servers.

For example, as illustrated in FIG. 4, the halo determination module 815 determines that the first storage server 105, which has two replica bricks 206 and 207, does not have enough storage bricks to store four (4) replicas of the dataset requested by the first client 150. Accordingly, the halo determination module 815 identifies the second storage server 110 to store the remaining number of requested replicas.

At block 935, the halo determination module 815 includes the identified one or more storage servers as part of the set of storage servers that are within the halo defined by the client, and the process proceeds to block 940. For example, as illustrated in FIG. 4, the halo determination module 815 considers the second storage server 110, in addition to the first storage server 105, to be within the halo defined by the first client 150.

Note that in the above example, number of replicas parameter overrides the halo latency parameter in determination of the storage servers that are within the halo. However, in some embodiments, the halo latency parameter may override the number of replicas parameter. The halo, e.g., storage servers in the halo, is determined as a function of various replication parameters defined in the storage policy. A user, e.g., a user associated with the client and/or an administrator of the replication interface, can define the function in the storage policy to determine the storage servers that are within the halo.

Referring back to the determination block 925, responsive to a determination that the set of storage servers have enough resources to store the requested number of replicas, at block 940, the replication module 820 replicates the dataset to the set of the storage servers synchronously. At block 945, the replication module 820 replicates the dataset to the remaining storage servers, e.g., storage servers that are outside of the halo, asynchronously, and the process 900 returns. For example, as illustrated in FIG. 3, the replication module 820 replicates the dataset to the first storage server 105 synchronously and the second storage server 110 and the third storage server 115 asynchronously. In some embodiments, the replication module 820 performs the synchronous replication and asynchronous replication simultaneously or concurrently, e.g., based on a request from the client.

Figure 10:
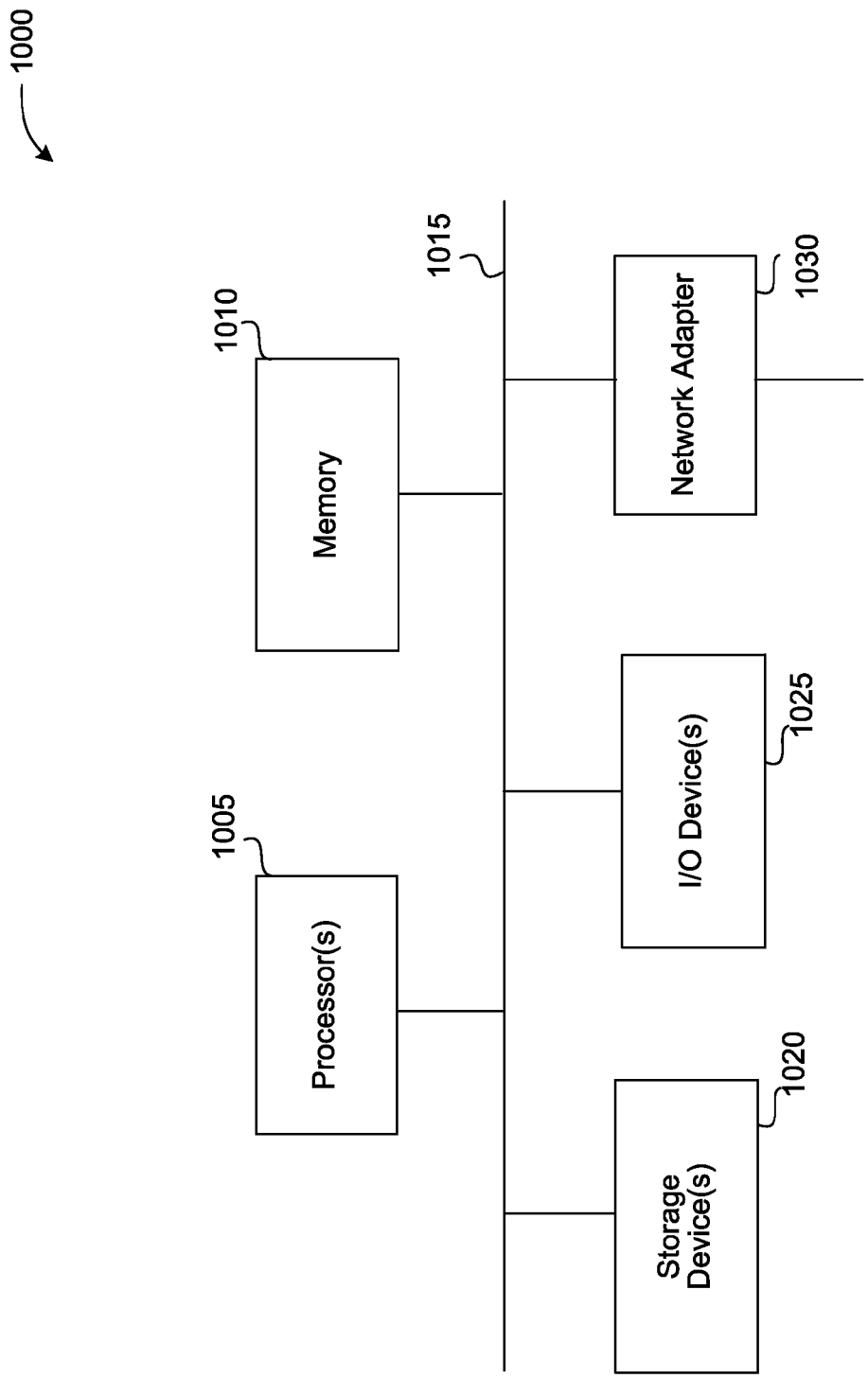
FIG. 10 is a block diagram of a computer system as may be used to implement features of some embodiments.

FIG. 10 is a block diagram of a computer system as may be used to implement features of some embodiments of the disclosed technology. The computing system 1000 may be used to implement any of the entities, components or services depicted in the examples of FIGS. 1-9 (and any other components described in this specification). The computing system 1000 may include one or more central processing units ("processors") 1005, memory 1010, input/output devices 1025 (e.g., keyboard and pointing devices, display devices), storage devices 1020 (e.g., disk drives), and network adapters 1030 (e.g., network interfaces) that are connected to an interconnect 1015. The interconnect 1015 is illustrated as an abstraction that represents any one or more separate physical buses, point to point connections, or both connected by appropriate bridges, adapters, or controllers. The interconnect 1015, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 1010 and storage devices 1020 are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media can include computer-readable storage media (e.g., "non-transitory" media) and computer-readable transmission media.

The instructions stored in memory 1010 can be implemented as software and/or firmware to program the processor(s) 1005 to carry out actions described above. In some embodiments, such software or firmware may be initially provided to the processing system 1000 by downloading it from a remote system through the computing system 1000 (e.g., via network adapter 1030).

The technology introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

I claim:

1. A method performed by a computing system, comprising:
    receiving, at a client computing system in a distributed computer network having a plurality of data storage servers, a request to store a dataset in the distributed computer network, the data storage servers configured to be read-write storage servers;
    identifying, by the client computing system and based on a halo latency parameter specified in a storage policy, a first set of the data storage servers that are within a halo group defined by the halo latency parameter and a second set of the data storage servers that are outside of the halo group, the halo latency parameter indicating a permissible threshold of a latency between the client computing system and a data storage server of the data storage servers to which the dataset is synchronously replicated, the latency being a time period elapsed between a dispatch of a request from the client computing system to the data storage server and a receipt of the response from the data storage server by the client computing system; and
    replicating the dataset to:
        the first set of the data storage servers synchronously, and
        the second set of the data storage servers asynchronously, the dataset concurrently replicated to the first set and the second set.

2. The method of claim 1, wherein identifying the first set of the storage servers that are within the halo group includes identifying the first set of the storage servers whose corresponding latencies do not exceed the permissible threshold.

3. The method of claim 1, wherein identifying the first set of the storage servers within the halo group includes identifying a first group of the storage servers whose corresponding latencies do not exceed the permissible threshold as being in an "online" state and a second group of the storage servers whose corresponding latencies exceed the permissible threshold as being in an "stand-by" state.

4. The method of claim 3, wherein replicating the dataset to the first set of the storage servers includes replicating the dataset to the first group of the storage servers that are in the "online" state.

5. The method of claim 1, wherein replicating the dataset to the second set of the storage servers includes replicating, by a daemon program, the dataset from the first set of the storage servers to the second set of the storage servers.

6. The method of claim 5, wherein the daemon program is configured to identify a first group of the storage servers that are in a second halo group as the second set of the storage servers, the second halo group including the first group of the storage servers having an infinite latency between a specified storage server of the first set of the storage servers on which the daemon program is executing and the first group of the storage servers.

7. The method of claim 1, wherein identifying the first set of the storage servers within the halo group further includes:
determining a number of replicas of the dataset to be stored in the distributed computer network,
determining whether the number of replicas exceed a maximum number of replicas to be stored at the first set of the storage servers,
responsive to a determination the number of replicas exceed the maximum number of replicas of the first set of the storage servers, identifying a subset of the second set of the storage servers to store a remaining number of replicas that exceed the maximum number of replicas.

8. The method of claim 7 further comprising:
replicating the remaining number of replicas of the dataset to the subset of the second set of the storage servers.

9. The method of claim 1, wherein the client is one of a plurality of clients and at least some of the clients have halo parameters with different latency thresholds.

10. The method of claim 1, wherein the distributed computer network is a GlusterFS distributed storage file system.

11. A system, comprising:
a processor;
a first module configured to store a storage policy used in storing a plurality of datasets at a plurality of storage servers in a distributed computer network, wherein at least some of the storage servers are configured to store a replica of a dataset of the datasets stored in another storage server of the storage servers, the storage policy including a halo parameter, the halo parameter including a set of tags associated with the storage servers, each of the set of tags describing a first attribute associated with the storage servers;
a second module that is configured to work in cooperation with the processor to receive a request from a client in the distributed computer network to store a first dataset of the datasets in the distributed computer network;
a third module that is configured to work in cooperation with the processor to identify a first set of the storage servers having one or more tags that match with the set of tags in the halo parameter as "online" storage servers and a second set of the storage servers whose one or more tags do not match with the set of tags in the halo parameter as "stand-by" storage servers; and
a fourth module that is configured to work in cooperation with the processor to synchronously replicate the first dataset to the "online" storage servers and asynchronously replicate the first dataset to the "stand-by" storage servers, the first dataset concurrently replicated to the "online" storage servers and the "stand-by" storage servers.

12. The system of claim 11, wherein one of the set of tags in the halo parameter is a latency tag, the latency tag describing a permissible latency threshold between the client and a storage server of the storage servers for replicating the first dataset to the storage server synchronously.

13. The system of claim 12, wherein the third module is configured to identify that the first set of the storage servers match with the halo parameter if latencies of each of the first set of the storage servers with the client do not exceed the permissible latency threshold.

14. The system of claim 11, wherein the storage servers are configured to store the datasets in a plurality of bricks, wherein a brick of the bricks is a smallest storage unit of a storage server of the servers, and wherein a group of the bricks from the storage servers form a volume.

15. The system of claim 14, wherein the client is configured to access a subset of the datasets stored at the group of the bricks by mounting the volume on the client, wherein the group of the bricks in the volume contain replicas of the subset of the datasets.

16. The system of claim 14, wherein the third module is further configured to identify the "online" storage servers and the "stand-by" storage servers by identifying a first subset of the group of the bricks in the volume corresponding to the "online" storage servers as "online" bricks and a second subset of the group of the bricks in the volume corresponding to the "stand-by" storage servers as "stand-by" bricks.

17. A non-transitory computer-readable storage medium storing computer-readable instructions, comprising:
instructions for receiving, at a first client in a distributed computer network having a plurality of storage servers, a request to store a first dataset in the distributed computer network, the storage servers configured to be read-write storage servers;
instructions for identifying, by the first client and based on a storage policy, a first set of the storage servers to which the first dataset is to be replicated synchronously, the identifying based on a halo latency parameter of the storage policy and a number of replicas parameter of the storage policy, the halo latency parameter indicating a permissible latency threshold between the first client and a storage server of the storage servers to replicate the first dataset synchronously, the latency being a time period elapsed between a dispatch of a request from the first client to the storage server and a receipt of the response from the storage server by the first client, the number of replicas parameter indicating a number of replicas of the first dataset to be stored in the distributed computer network; and
instructions for replicating the first dataset to:
the first set of the storage servers synchronously, and
a remaining set of the storage servers asynchronously, the first dataset concurrently replicated to the first set and the remaining set.

18. The non-transitory computer-readable storage medium of claim 17, wherein the instructions for identifying the first set of the storage servers include:
instructions for identifying a first group of the storage servers that are within a halo group defined by the halo latency parameter as the first set,
instructions for identifying, if the number of replicas exceed a maximum number of replicas of the first group of the storage servers, a second group of the storage servers that are outside the halo group, the second group to store a remaining number of replicas that exceed the maximum number of replicas of the first group of the storage servers, the first group and the second group forming the first set.

19. The non-transitory computer-readable storage medium of claim 17, wherein the instructions for replicating the first dataset to the first set of the storage servers includes:
instructions for determining that the first dataset overlaps with a second dataset stored at the storage servers, the second dataset replicated to the storage servers by a second client in the distributed computer network, and instructions for resolving a conflict between the first dataset and the second dataset based on a conflict resolution policy, the conflict resolution policy including instructions for choosing a dataset of the first dataset and the second dataset based on at least one of a number of copies of the dataset stored at the storage servers, a time at which the dataset is created by a client, a majority vote from the storage servers, or a size of the dataset.

\* \* \* \* \*